(12) United States Patent
Bryan et al.

(10) Patent No.: US 11,282,157 B2
(45) Date of Patent: Mar. 22, 2022

(54) SYSTEM AND METHOD FOR MANAGEMENT OF PRODUCT MOVEMENT

(71) Applicant: Walmart Apollo, LLC, Bentonville, AR (US)

(72) Inventors: Greg A. Bryan, Centerton, AR (US); Cristy C. Brooks, Cassville, MO (US); David Blair Brightwell, Bella Vista, AR (US); Benjamin D. Enssle, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 74 days.

(21) Appl. No.: 16/925,041

(22) Filed: Jul. 9, 2020

(65) Prior Publication Data
US 2020/0342561 A1   Oct. 29, 2020

Related U.S. Application Data

(63) Continuation of application No. 15/906,396, filed on Feb. 27, 2018, now abandoned.
(Continued)

(51) Int. Cl.
*G06Q 50/28* (2012.01)
*B64C 39/02* (2006.01)
*G05D 1/00* (2006.01)

(52) U.S. Cl.
CPC ............ *G06Q 50/28* (2013.01); *B64C 39/024* (2013.01); *G05D 1/0088* (2013.01); *B64C 2201/128* (2013.01); *B64C 2201/141* (2013.01)

(58) Field of Classification Search
CPC .... G05D 1/0088; G06Q 10/08; G06Q 10/087; G06Q 10/0875; G06Q 50/28; B64C 39/024; B64C 2201/128; B64C 2201/141
(Continued)

(56) References Cited

U.S. PATENT DOCUMENTS

| 5,963,919 A | 10/1999 | Brinkley |
| 6,681,990 B2 | 1/2004 | Vogler |

(Continued)

FOREIGN PATENT DOCUMENTS

| CA | 2682886 | 4/2010 |
| CN | 204270352 U | 4/2015 |

(Continued)

OTHER PUBLICATIONS

"Improve Productivity and Customer Service in the Retail Store With Automated Inventory Management: The MC2100 in retail"; Zebra Technologies; Apr. 2015; pp. 1-6.
(Continued)

*Primary Examiner* — Joshua E Rodden
(74) *Attorney, Agent, or Firm* — Fitch, Even, Tabin & Flannery LLP

(57) ABSTRACT

A shelving system includes customer shelves, and a top shelf is positioned generally above the customer shelves. The top shelf and a back room are not accessible to the public, but the customer shelves are accessible to the public. First scans of the top shelf and second scans of the customer shelves and back room inventory values for the selected product are obtained. A determination is made as whether there is inventory of the selected product in the back room. When there is available space on the top shelf, when the available space is within a predetermined distance of the location, and when there is inventory of the selected product in the back room, instructions are transmitted to an automated vehicle to cause the automated vehicle to selectively move at least some of the selected product from the back room to the top shelf.

20 Claims, 3 Drawing Sheets

Related U.S. Application Data

(60) Provisional application No. 62/471,422, filed on Mar. 15, 2017.

(58) Field of Classification Search
USPC .................................................................. 701/3
See application file for complete search history.

(56) References Cited

U.S. PATENT DOCUMENTS

| | | | |
|---|---|---|---|
| 6,726,099 B2 | 4/2004 | Becker | |
| 6,758,403 B1 | 7/2004 | Keys | |
| 7,084,769 B2 | 8/2006 | Bauer | |
| 7,222,786 B2 | 5/2007 | Renz | |
| 7,370,005 B1 | 5/2008 | Ham | |
| 7,480,623 B1 | 1/2009 | Landvater | |
| 7,552,066 B1* | 6/2009 | Landvater | G06Q 10/06315 705/7.25 |
| 7,616,117 B2 | 11/2009 | Streeb | |
| 7,693,757 B2* | 4/2010 | Zimmerman | G05D 1/0274 705/28 |
| 7,788,119 B2 | 8/2010 | Najmi | |
| 7,792,709 B1 | 9/2010 | Trandal | |
| 7,950,579 B2 | 5/2011 | Gray | |
| 7,954,712 B2 | 6/2011 | Babcock | |
| 8,091,782 B2* | 1/2012 | Cato | G06Q 10/087 235/385 |
| 8,107,736 B2* | 1/2012 | Brown | G06Q 10/087 382/190 |
| 8,189,855 B2 | 5/2012 | Opalach | |
| 8,191,672 B2 | 6/2012 | Kondo et al. | |
| 8,195,533 B1 | 6/2012 | Mishra | |
| 8,224,717 B2 | 7/2012 | Giacobbe | |
| 8,260,456 B2 | 9/2012 | Siegel | |
| 8,321,302 B2 | 11/2012 | Bauer | |
| 8,321,303 B1* | 11/2012 | Krishnamurthy | G06Q 30/02 705/28 |
| 8,346,630 B1 | 1/2013 | McKeown | |
| 8,423,431 B1 | 4/2013 | Rouaix | |
| 8,521,620 B2 | 8/2013 | Livingston | |
| 8,577,136 B1* | 11/2013 | Ascher | G06Q 10/087 382/165 |
| 8,616,822 B2* | 12/2013 | Winkler | B65B 5/04 414/276 |
| 8,732,039 B1 | 5/2014 | Chen | |
| 8,965,796 B1 | 2/2015 | Gala | |
| 9,120,622 B1* | 9/2015 | Elazary | B25J 15/0608 |
| 9,165,277 B2 | 10/2015 | Jones | |
| 9,171,278 B1 | 10/2015 | Kong | |
| 9,205,886 B1 | 12/2015 | Hickman | |
| 9,280,757 B2 | 3/2016 | Parpia | |
| 9,378,484 B1 | 6/2016 | Russell | |
| 9,415,935 B1 | 8/2016 | MacFarlane | |
| 9,758,301 B2* | 9/2017 | Porat | B25J 9/1679 |
| 10,019,803 B2* | 7/2018 | Venable | G06T 7/521 |
| 10,089,055 B1 | 10/2018 | Fryman | |
| 10,130,177 B2* | 11/2018 | Jones | G01B 11/16 |
| 10,130,232 B2 | 11/2018 | Atchley | |
| 10,138,060 B1* | 11/2018 | Mantha | B25J 5/02 |
| 10,169,738 B2* | 1/2019 | Jones | H04N 5/2253 |
| 10,189,642 B2* | 1/2019 | High | G05D 1/027 |
| 10,192,157 B2 | 1/2019 | Cote | |
| 10,289,990 B2* | 5/2019 | Rizzolo | G06Q 20/201 |
| 10,311,400 B2* | 6/2019 | Mascorro Medina | G06Q 30/016 |
| 10,360,548 B2 | 7/2019 | Brooks | |
| 10,373,116 B2* | 8/2019 | Medina | G05D 1/106 |
| 10,453,009 B2 | 10/2019 | Ulrich | |
| 10,467,587 B2* | 11/2019 | Bogolea | G05D 1/0282 |
| 10,489,677 B2* | 11/2019 | Rzeszutek | G06Q 10/087 |
| 10,505,057 B2* | 12/2019 | Haist | G06K 7/10752 |
| 10,546,258 B2 | 1/2020 | Jones | |
| 10,552,792 B2 | 2/2020 | Mattingly | |
| 10,558,947 B2 | 2/2020 | Bryan | |
| 2001/0047293 A1 | 11/2001 | Waller | |
| 2002/0138336 A1 | 9/2002 | Bakes | |
| 2002/0174001 A1 | 11/2002 | Henry | |
| 2003/0216969 A1 | 11/2003 | Bauer | |
| 2003/0233277 A1 | 12/2003 | Saunders | |
| 2004/0158507 A1 | 8/2004 | Meek | |
| 2006/0157150 A1 | 7/2006 | Blakeslee | |
| 2007/0021864 A1* | 1/2007 | Mountz | G06Q 10/087 700/216 |
| 2007/0144991 A1* | 6/2007 | Hansl | B66F 9/141 211/121 |
| 2008/0077510 A1* | 3/2008 | Dielemans | G06Q 10/087 705/28 |
| 2008/0120205 A1 | 5/2008 | Hoopes | |
| 2008/0255968 A1 | 10/2008 | Heinrichs | |
| 2008/0270269 A1 | 10/2008 | Myers | |
| 2009/0060349 A1 | 3/2009 | Linaker | |
| 2009/0063310 A1 | 3/2009 | Alonzo | |
| 2009/0101713 A1 | 4/2009 | Ulrich | |
| 2009/0157533 A1 | 6/2009 | Ohno | |
| 2010/0106609 A1 | 4/2010 | Sherman | |
| 2010/0138037 A1 | 6/2010 | Adelberg | |
| 2012/0209734 A1 | 8/2012 | Brooks | |
| 2012/0259655 A1 | 10/2012 | Madreperla | |
| 2012/0310781 A1 | 12/2012 | Battle | |
| 2013/0018696 A1 | 1/2013 | Meldrum | |
| 2013/0211870 A1 | 8/2013 | Lawson | |
| 2014/0006131 A1 | 1/2014 | Causey | |
| 2014/0006229 A1 | 1/2014 | Birch | |
| 2014/0100769 A1 | 4/2014 | Wurman | |
| 2014/0143039 A1 | 5/2014 | Branton | |
| 2014/0180865 A1 | 6/2014 | Argue | |
| 2014/0201042 A1 | 7/2014 | Meyer | |
| 2014/0247116 A1 | 9/2014 | Davidson | |
| 2014/0344118 A1 | 11/2014 | Parpia | |
| 2014/0379535 A1 | 12/2014 | Briet | |
| 2015/0039373 A1 | 2/2015 | Anand | |
| 2015/0178654 A1 | 6/2015 | Glasgow | |
| 2015/0235157 A1 | 8/2015 | Avegliano | |
| 2015/0242805 A1 | 8/2015 | Sakurai | |
| 2015/0379366 A1 | 12/2015 | Nomura | |
| 2016/0042315 A1 | 2/2016 | Field-Darragh | |
| 2016/0114488 A1 | 4/2016 | Mascorro Medina | |
| 2016/0132823 A1 | 5/2016 | Swafford | |
| 2016/0132910 A1 | 5/2016 | Appel | |
| 2016/0171428 A1 | 6/2016 | Gooijer | |
| 2016/0371613 A1 | 12/2016 | Ulrich | |
| 2017/0148005 A1* | 5/2017 | Murn | G06Q 10/087 |
| 2017/0155788 A1 | 6/2017 | Kobayashi | |
| 2017/0193430 A1* | 7/2017 | Barreira Avegliano | G06T 7/74 |
| 2017/0200106 A1 | 7/2017 | Jones | |
| 2018/0005174 A1 | 1/2018 | Dixon | |
| 2018/0060804 A1* | 3/2018 | Cheruku | G06K 9/4661 |
| 2018/0089613 A1* | 3/2018 | Chen | G02B 5/208 |
| 2018/0268355 A1 | 9/2018 | Bryan | |
| 2018/0268356 A1 | 9/2018 | Bryan | |
| 2018/0268364 A1 | 9/2018 | Bryan | |
| 2018/0268366 A1 | 9/2018 | Bryan | |
| 2018/0268367 A1 | 9/2018 | Bryan | |
| 2018/0268509 A1 | 9/2018 | Bryan | |
| 2018/0341906 A1 | 11/2018 | Bryan | |
| 2019/0073775 A1* | 3/2019 | Lam | G06K 9/3233 |
| 2019/0149725 A1* | 5/2019 | Adato | H04N 1/32144 348/158 |
| 2019/0215424 A1* | 7/2019 | Adato | G06Q 50/28 |
| 2019/0291954 A1* | 9/2019 | Lee | B65G 1/137 |
| 2019/0303863 A1* | 10/2019 | Ghosh | G06F 16/2365 |

FOREIGN PATENT DOCUMENTS

| | | |
|---|---|---|
| EP | 1901215 | 3/2008 |
| WO | 2015184286 | 12/2015 |
| WO | 2016109251 | 7/2016 |

OTHER PUBLICATIONS

"Shelf Monitor"; Tech Mahindra; https://www.techmahindra.com/industries/Enterprise/retail_and_cpg/retail/solutions/shelf_monitor.aspx; 2016; pp. 1-1.

(56) References Cited

OTHER PUBLICATIONS

Angell, Robert C., "Control of State-Wide Liquor Inventories", National Association of Cost Accountants; NACA Bulletin (pre-1986); Feb. 15, 1948; pp. 1-9.
Bourzac, Katherine; "A Robot Takes Stock"; https://www.technologyreview.com/s/428374/arobottakesstock/; Published Jun. 29, 2012; pp. 1-4.
Fraunhofer; "The flying inventory assistant"; http://www.fraunhofer.de/en/press/research-news/2014/december/the-flying-inventoryassistant.html; Published Dec. 1, 2014; pp. 1-3.
Gruen, Thomas W., et al.; "A Comprehensive Guide to Retail Out-of-Stock Reduction in the Fast-Moving Consumer Goods Industry"; 2007; 71 pgs.
Kang, Yun, et al.; "Information Inaccuracy in Inventory Systems—Stock Loss and Stockout"; Massachusetts Institute of Technology; Published Aug. 23, 2004; 29 pages.
Lowe's Home Improvement; "Lowe's Introduces LoweBot"; https://www.youtube.com/watch?v=hP3yfGHTXFo; Published on Aug. 30, 2016; pp. 1-10.
McClain, John O; Cornell University; "Simulating Inventory Control with Orders that Cross during Lead Time"; http://www.exinfm.com/excel%20files/Inventory_Simulation.xls; Mar. 22, 2002; pp. 1-60.
Moyer, Ted; TotalRetail; "5 Steps to Solving the Out-of-Stock Problem"; http://www.mytotalretail.com/article/5stepstosolvingtheoutofstockproblem/; Published Apr. 19, 2016; pp. 1-7.
PCT; App. No. PCT/US2018/012347; International Search Report and Written Opinion dated Mar. 6, 2018.
PCT; App. No. PCT/US2018/033135; International Search Report and Written Opinion dated Aug. 3, 2018.
SAP; "How to Set Up and Manage a Perpetual Inventory System"; SAP; Jun. 22, 2016; pp. 1-108.
Stuart, Sophia; "Meet Tally, the Robot That Knows What's on Store Shelves"; http://in.pcmag.com/roboticsautomation/99587/news/meettalltytherobotthatknowswhatsonstoreshelves; Published Jan. 27, 2016; pp. 1-8.
Trujillo, Paul; "Walmart is Addressing Inventory Problems With a New System"; http://www.waspbarcode.com/buzz/walmart-2/; Nov. 15, 2016; pp. 1-7.
Vanian, Jonathan; "Target's New Robot Helper is Busy at Work on Aisle 3"; http://fortune.com/2016/04/28/targettestingrobotinventorysimbe/; Published Apr. 28, 2016; pp. 1-8.
Wharton School; "Robot Assistants in Aisle 10: Will Shoppers Buy It?"; http://knowledge.wharton.upenn.edu/article/robots-aisle-10-will-shoppers-like/; Published Sep. 7, 2016; pp. 1-5.

\* cited by examiner

SYSTEM AND METHOD FOR MANAGEMENT OF PRODUCT MOVEMENT

CROSS-REFERENCE TO RELATED APPLICATION

This application is a continuation application of U.S. application Ser. No. 15/906,396, filed Feb. 27, 2018, which claims the benefit of U.S. Provisional Application No. 62/471,422, filed Mar. 15, 2017, both of which are incorporated herein by reference in their entireties.

TECHNICAL FIELD

This invention relates generally to the management of product movement, and more particularly, to the management of product movement within a retail store.

BACKGROUND

Stores utilize various measures to keep track of and manage products. One such measure is the perpetual inventory (PI) value associated with a product. In aspects, the PI value represents the quantity of product in the store. The PI value typically changes over time so as to accurately reflect the number of actual products in the store. For instance, products are purchased by customers and removed from the store affecting the PI value. Shipments arrive at the store and include additional products also affecting the PI value.

Stores also utilize other measures that relate to the value and availability of products for accounting and other purposes. For example, a back room quantity value of a product may be the value of all of the product present in the back room (storage area) of the retail store.

Sometimes the PI value does not accurately reflect the correct number of products in the store. This can happen for a variety of reasons including mis-scanning products as the products leave or depart the store, or other forms of human error. If the PI value is incorrect, then various problems can develop. For instance, shipments can be ordered at the wrong times and for the wrong quantity of products.

Products also move between different areas of the store. The movement may be initiated based upon changes to the PI value. For instance, movement of products occurs between a back room (where products are stored) and shelves in the retail area of the store when it is believed products need to be restocked. Unfortunately, sometimes the products are moved from the back room to the retail area, and then back to the back room when it is discovered there are already sufficient numbers of the product in the retail area. Such movement wastes resources in the retail store and results in inefficient operation of the retail store.

BRIEF DESCRIPTION OF THE DRAWINGS

Disclosed herein are embodiments of systems, apparatuses and methods pertaining to managing product movement. This description includes drawings, wherein.

Figure 1:
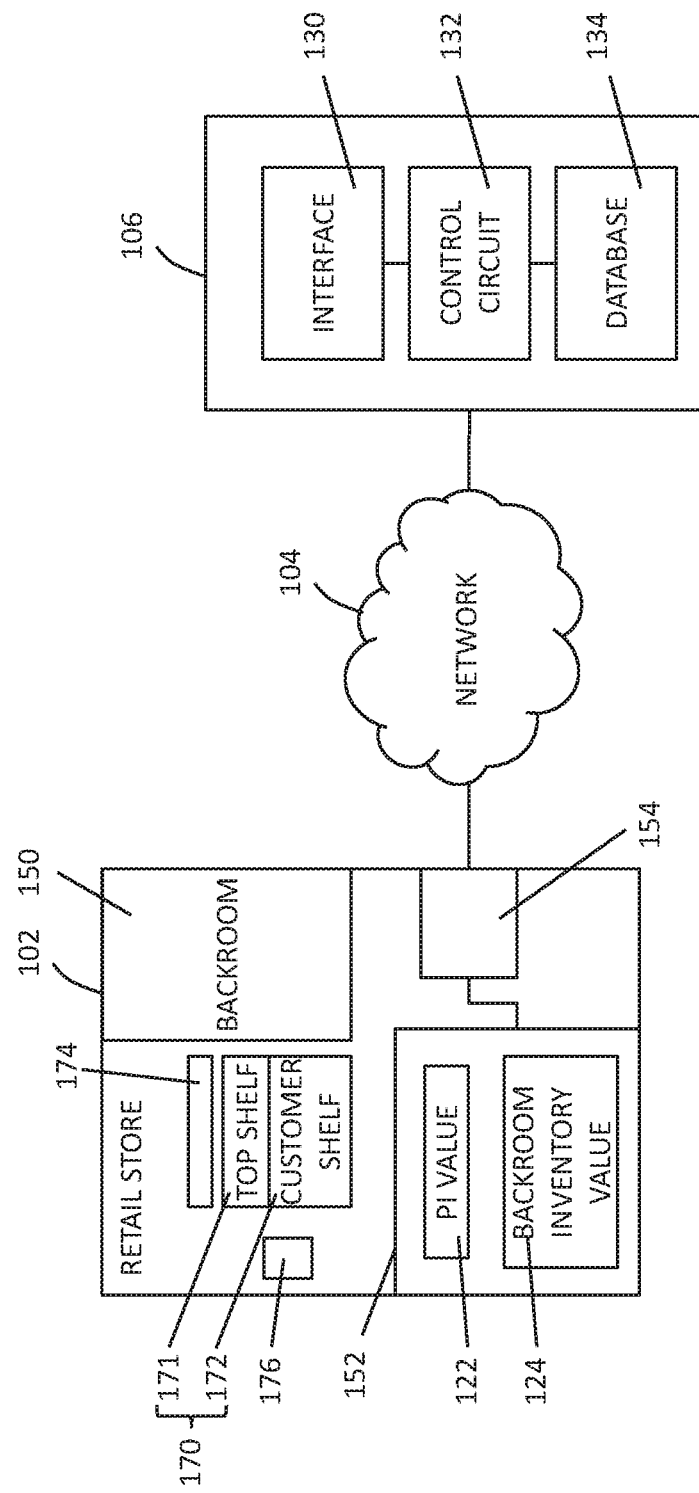
FIG. 1 is a block diagram showing one example of a system that manages product movement in a retail store in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, systems, apparatuses and methods are provided that manage product dispositions within retail stores. Advantageously, movement of products between the back room and top shelf of a retail store is optimized. These approaches ensure that there are no returns of the product from the top shelf to the back room once an attempt is made to move the product from the back room to the top shelf.

In some of these embodiments, a system that is configured to control the movement of products between a back room in a retail store and a sales area in the retail store includes a shelving system, a first sensor, a second sensor, a database, and a control circuit. The retail store has a back room that is not accessible to the public.

The shelving system includes a top shelf and customer shelves. In aspects, the top shelf is positioned generally above the customer shelves, and is not accessible to the public. The customer shelves are accessible to the public. The first sensor is configured to obtain first scans of the top shelf. The second sensor is configured to obtain second scans of the customer shelves.

The database is configured to store a back room inventory value for the selected product. The back room inventory value is the amount of the selected product present in the back room.

The control circuit is coupled to the first sensor, the second sensor, and the database. The control circuit is configured to receive the first scans from the first sensor. The second scans are from the second sensor. The control circuit also receives the back room inventory value from the database.

The control circuit is further configured to determine when there is available space for a selected product on the top shelf of the set of shelves based upon a first analysis of the first scans. The control circuit is also configured to, based upon a second analysis of the second scans, determine a location of the selected product on the customer shelves and whether the location is within a predetermined distance of the available space on the top shelf.

The control circuit is further configured to determine when there is inventory of the selected product in the back room based at least in part upon the back room inventory value. The control circuit is configured to transmit first instructions to an automated vehicle to cause the automated vehicle to selectively move at least some of the selected product from the back room to the top shelf when all of three conditions are met. The three conditions include when there is available space on the top shelf, when the available space is within a predetermined distance of the location, and when there is inventory of the selected product in the back room.

In aspects, the first sensor is coupled to a ceiling of the store. In examples, the first sensor is a camera. In other examples, the second sensor is a scanner or a camera.

In other aspects, the control circuit is further configured to transmit second instructions to an automated vehicle to cause the automated vehicle to determine when there is inventory of the selected product in the back room. In other examples, the control circuit transmits second instructions to place the selected product in a position in the back room allowing the automated vehicle to retrieve the selected product before other products.

In some examples, the back room includes a plurality of storage bins where products can be placed. In other aspects, the automated vehicle is an automated ground vehicle or an automated aerial vehicle.

In others of these embodiments, the movement of products between a back room in a retail store and the top shelf of a shelving system in the retail store is controlled. The shelving system also includes customer shelves, and the top shelf is positioned generally above the customer shelves. The top shelf and the back room are not accessible to the public, but the customer shelves are accessible to the public.

First scans of the top shelf and second scans of the customer shelves are obtained. A back room inventory value for the selected product is stored. The back room inventory value is the amount of the selected product present in the back room.

The first scans from the first sensor are received and the second scans from the second sensor are received, for example, from the retail store. The back room inventory value are received from the database. A determination is made as to whether there is available space for a selected product on the top shelf of the set of shelves based upon a first analysis of the first scans. Based upon a second analysis of the second scans, a location of the selected product on the customer shelves is determined and whether the location is within a predetermined distance of the available space on the top shelf is also determined.

A determination is made as whether there is inventory of the selected product in the back room based at least in part upon the back room inventory value. When there is available space on the top shelf, when the available space is within a predetermined distance of the location, and when there is inventory of the selected product in the back room, first instructions are transmitted to an automated vehicle to cause the automated vehicle to selectively move at least some of the selected product from the back room to the top shelf.

In still others of these embodiments, a system is configured to control the movement of products between a back room in a retail store and a sales area in the retail store. The system includes an automated vehicle, a shelving system, a first sensor, a second sensor, a database, a transceiver circuit, a network, and a control circuit.

The automated vehicle is disposed at a retail store. The shelving system is disposed in the retail store and the retail store has a back room. The shelving system includes a top shelf and customer shelves. The top shelf is positioned generally above the customer shelves. The top shelf and the back room are not accessible to the public, and the customer shelves are accessible to the public.

The first sensor is disposed at the retail store and is configured to obtain first scans of the top shelf. The second sensor is disposed at the retail store and is configured to obtain second scans of the customer shelves.

The database is disposed at the retail store and is configured to store a back room inventory value for the selected product. The back room inventory value is the amount of the selected product present in the back room.

The transceiver circuit is disposed at the retail store and is coupled to the database, the first sensor and the second sensor. The network is coupled to the transceiver circuit.

The control circuit is coupled to the network and is disposed at a central processing location. The control circuit is further configured to receive the first scans from the first sensor, the second scans from the second sensor, and the back room inventory value from the database. The control circuit is still further configured to determine when there is available space and a location of the available space for a selected product on the top shelf of the set of shelves based upon a first analysis of the first scans.

The control circuit is yet further configured to based upon a second analysis of the second scans, determine a product location of the selected product on the customer shelves and whether the product location is within a predetermined distance of the available space on the top shelf. The control circuit is configured to determine when there is inventory of the selected product in the back room based at least in part upon the back room inventory value. The control circuit is further configured to, when there is available space on the top shelf, when the location of the available space is within a predetermined distance of the product location, and when there is inventory of the selected product in the back room, transmit first instructions to the automated vehicle to cause the automated vehicle to selectively move at least some of the selected product from the back room to the top shelf.

Referring now to FIG. 1, one example of a system 100 for adjusting the PI value of a selected product in a retail store 102 is described. The retail store 102 may be any type of retail store, for example, a discount center, a grocery store, a department store, or a hardware store to mention a few examples.

The retail store 102 includes a back room 150. The back room 150 is a room or other area of the retail store that is not accessible to the public. The back room 102 may be secured from public entry by using locks, doors, or any other approach of keeping the public from entering the back room 150. The back room 150 may be used to store products. Products may be shipped from a supplier and placed directly in the back room 150.

The retail store 102 has a shelving system 170. The shelving system 170 includes a top shelf 171 and customer shelves 172. In aspects, the structure of the shelving system 170 is configured so that the top shelf 171 is not accessible to the public. For example, the top shelf 171 may be located at such a height that the public cannot access the top shelf 171 (or products on the top shelf 171). In other examples, a barrier or other restraining device prevents public access to the top shelf 171. It will be appreciated that in some examples the top shelf is located above the customer shelves 172, the top shelf 171 may be located anywhere and in any direction with respect to the customer shelves 172.

The customer shelves 172 are accessible to the public. The customer shelves 172 store the product.

A first sensor 174 senses products on the top shelf 171. In examples, the first sensor 174 may be secured to the ceiling of the store. In examples, the first sensor 174 is a camera that obtains visual images of the top shelf 171. The images can be processed to determine whether a product exists on the top shelf 171 and the location of the product on the top shelf 171. In other examples, the sensor 174 is an RFID sensor that senses RFID tags on products.

A second sensor 176 determines the existence and/or location of products on the customer shelves 172. In examples, the second sensor 176 is a camera that obtains visual images of the customer shelves 172. The images can be processed to determine whether a product exists on the customer shelves 172 and the location of the product on the customer shelves 172. In other examples, the sensor 176 is an RFID sensor that senses RFID tags on products. The sensor 176 may be disposed at a fixed location. Either of the sensors 174 or 176 may be disposed at an automated vehicle such as an automated ground vehicle or an aerial drone.

The retail store 102 includes a database 152 that stores for each product a PI value 122. The PI value 122 for the selected product indicates the amount of a selected product in the retail store. The database 152 also stores a back room inventory value 124. The back room inventory value 124 is the amount of the selected product present in the back room 150.

A communication device 154 allows the retail store 102 to communicate with devices and entities that are external to the store. The communication device 154 may include any combination of hardware or software that allows communications to be received at the retail store 102, and makes transmissions from the retail store 102. In one example, the communication device 154 may be a transceiver circuit. The communication device 154 may be deployed within or at another device (e.g., a modem, a smart phone, or a personal computer, to mention a few examples).

Cloud network 104 is coupled to the communication device 154 (e.g., a transceiver) at the retail store 102. The cloud network 104 may be any type of computer or communication network and may include routers, gateways, and servers to mention a few examples of devices that can form or be utilized in the network 104. The cloud network 104 may also be combinations of various types of networks.

The apparatus 106 includes an interface 130, a control circuit 132, and a database 134. The interface 130 is configured to receive from the retail store 102 the perpetual inventory (PI) value 122 and the back room inventory value 124 associated with the selected product. The database 134 stores the PI value 122 and the back room inventory value 124 obtained from the retail store 102. The interface 130 also receives first scans from the sensor 174 and second scans from the second sensor 176. The scans may also be stored in the data base 134. The apparatus 106 may be deployed at a central processing center such as the home office of the retail store. In aspects, the interface 130 may be incorporated into or be coextensive with the control circuit 132.

The control circuit 132 is coupled to the interface 130 and the database 134. The control circuit 132 is configured to obtain the PI value 122, the back room inventory value 124, and the scans from the database 134. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 132 may be configured (for example, by using corresponding programming stored in a memory as will be well understood by those skilled in the art) to carry out one or more of the steps, actions, and/or functions described herein.

The control circuit 132 is configured to determine when there is available space for a selected product on the top shelf 171 of the set of shelves 170 based upon a first analysis of the first scans. The control circuit is also configured to, based upon a second analysis of the second scans, determine a location of the selected product on the customer shelves 172 and whether the location is within a predetermined distance of the available space on the top shelf 171. The control circuit 132 is further configured to determine when there is inventory of the selected product in the back room 150 based at least in part upon the back room inventory value 124.

The control circuit 132 is configured to transmit first instructions to an automated vehicle to cause the automated vehicle to selectively move at least some of the selected product from the back room 150 to the top shelf 171 when all of three conditions are met. The three conditions include when there is available space on the top shelf 171, when the available space is within a predetermined distance of the location, and when there is inventory of the selected product in the back room 150.

Figure 2:
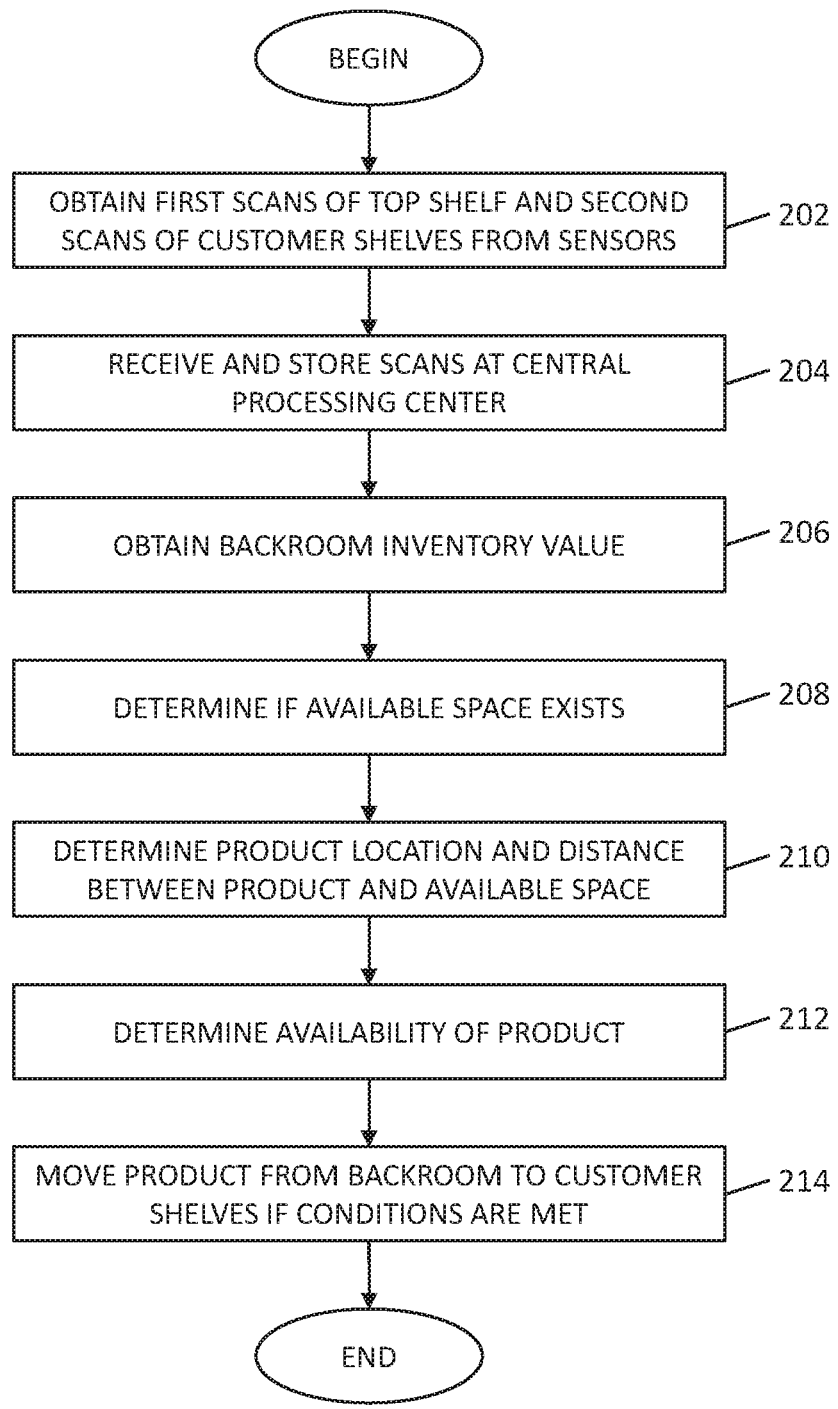
FIG. 2 is a flowchart showing one example of an approach for managing product movement in a retail store in accordance with some embodiments.

Referring now to FIG. 2, one example of an approach for managing product movement in a retail store is described. In others of these embodiments, the movement of products between a back room in a retail store and the top shelf of a shelving system in the retail store is controlled. The shelving system also includes customer shelves, and the top shelf is positioned generally above the customer shelves. The top shelf and the back room are not accessible to the public, but the customer shelves are accessible to the public.

At step 202, first scans of the top shelf and second scans of the customer shelves are obtained from sensors. A back room inventory value for the selected product is stored. The back room inventory value is the amount of the selected product present in the back room.

At step 204, the first scans from the first sensor are received and the second scans from the second sensor are received, for example, at a central processing center and from the retail store. The scans can be in any data format or according to any protocol. In aspects, the scans are visible images.

At step 206, the back room inventory value is obtained from the database. The database may be at the central processing center or at the retail store. In aspects, the back room inventor value is transmitted from the database at the retail store to the database at the central processing center.

At step 208, a determination is made as to whether there is available space for a selected product on the top shelf of the set of shelves based upon a first analysis of the first scans. The available space is of sufficient dimensions (e.g., height, width, depth, volume) for a product to be positioned at the space.

At step 210, based upon a second analysis of the second scans, a location of the selected product on the customer shelves is determined and whether the location is within a predetermined distance of the available space on the top shelf is also determined. In aspects, a predetermined coordinate system (e.g., the Cartesian coordinate system) is associated with or imposed upon the shelving system. Consequently, every location on the shelving system has coordinates. With known coordinates, the distance between points (e.g., between a product on a customer shelf and an open space on the top shelf) can be easily determined using mathematical approaches well known to those skilled in the art.

In aspects, the top shelf can be coated or painted with a material or paint that can be sensed by the sensor. If a predetermined amount of this material is detected in the image, then an available space or area exists on the top shelf.

At step 212, a determination is made as whether there is inventory of the selected product in the back room based at least in part upon the back room inventory value.

At step 214, when there is available space on the top shelf, when the available space is within a predetermined distance of the location, and when there is inventory of the selected product in the back room, first instructions are transmitted to an automated vehicle to cause the automated vehicle to selectively move at least some of the selected product from the back room to the top shelf.

Figure 3:
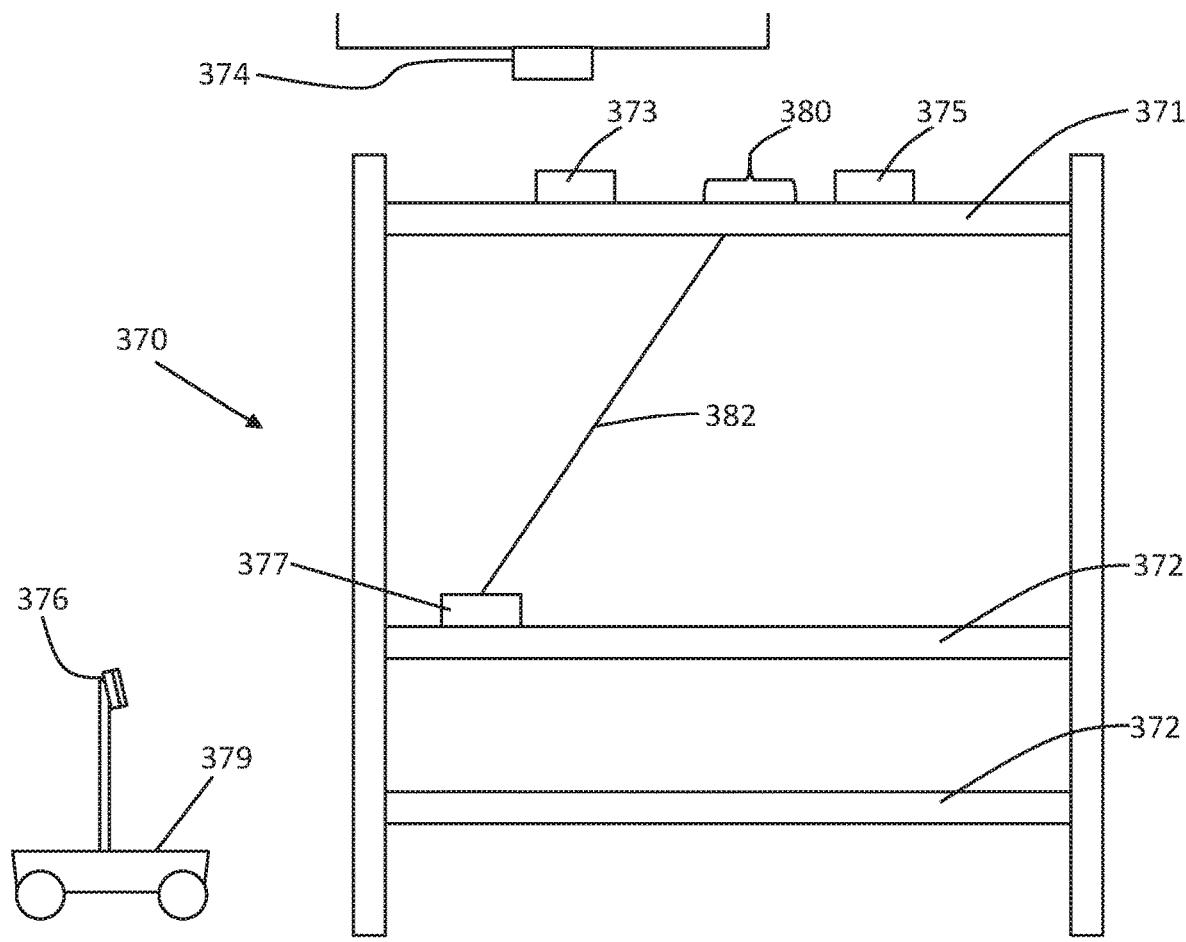
FIG. 3 is a block diagram showing a shelving system in accordance with some embodiments.

Referring now to FIG. 3, an example of approaches to manage product movement in a retail store is described. A shelving system 370 includes a top shelf 371 and retail shelves 372.

The structure of the shelving system 370 is configured so that the top shelf 371 is not accessible to the public. In this case, the top shelf 371 may be located at such a height that the public cannot access the top shelf 371 (or products 373 and 375 on the top shelf 371). The customer shelves 372 are accessible to the public and store or hold a product 377.

A first sensor 374 disposed at the ceiling above the top shelf 371 senses products on the top shelf 371. In examples, the first sensor 374 is a camera that obtains visual images of the top shelf 371. The images can be processed to determine whether a product exists on the top shelf 371 and the location of the product on the top shelf 371. In other examples, the sensor 374 is an RFID sensor that senses RFID tags on products.

In aspects, the top shelf can be coated or painted with a material or paint that can be sensed by the sensor 374. If a predetermined amount, area, or volume of this material is detected in the image, then empty or available space exists on the top shelf 371. Visual images of know products can then be compared to the image to determine the identity of products on the top shelf. Additionally, the top shelf 371 may be assigned a known coordinate system such that identified products can be correlated with the coordinate system and the location of the product (relative to the coordinate system) determined.

A second sensor 376 determines the existence and/or location of products on the customer shelves 372. In examples, the second sensor 376 is a camera that obtains visual images of the customer shelves 372. The images can be processed to determine whether the product 377 exists on the customer shelves 372 and the location of the product 377 on the customer shelves 372. In these regards, the same coordinate system used to define locations on the top shelf 371 also defines locations on the shelves 372.

In other examples, the sensor 376 is an RFID sensor that senses RFID tags on products. The sensor 376 is disposed on an automated ground vehicle 379, but can be disposed on an aerial drone or at a fixed location.

A determination is made (e.g., at a central control center not shown in FIG. 3) as to whether there is available space for a selected product on the top shelf 371 of the set of shelves 370 based upon a first analysis of the scans from the sensor 374. In this example, available space 380 is located on the top shelf 371. The available space is of sufficient dimensions (e.g., height, width, depth, volume) for a product to be positioned at the space.

Based upon an analysis of the scans, a location of the selected product 377 on the customer shelves 372 is determined and whether the location is within a predetermined distance of the available space on the top shelf is also determined. In this example, a distance 382 is determined to exist between the product 377 and the available space 380. The distance 382 is compared to a predetermined threshold. If the distance 382 is below the threshold, then the space 380 can be used to hold a product of the same type as the product 377. In other words, a determination is made as to whether the space 380 is really meant to store a product of the same type as the product 377. When the distance is too great, then it is assumed that the space 380 is meant for a product of a different type than the product 377.

In other examples, the top shelf may be divided by markers (e.g., visible markers) that divide product space into areas. Each of the areas may be linked to a product type. The linkage can be stored in a database. Images obtained from the sensor 374 can be analyzed to determine whether open space exists within certain of the delineated areas. When open space is found in one of the areas, the associated product can be easily ascertained using the data structure. Consequently, whether open space exists on the top shelf for a particular product is determined.

A determination is also made as whether there is inventory of the selected product 377 in the back room based at least in part upon the back room inventory value. When there is available space 380 on the top shelf 371, when the available space 380 is within a predetermined distance of the location of the product 377, and when there is inventory of the selected product 377 in the back room, instructions are transmitted to the automated vehicle 379 to cause the automated vehicle to selectively move at least some of the selected product 377 from the back room to the top shelf 371.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system that is configured to control the movement of products between a back room in a retail store and a sales area in the retail store, the system comprising:
   a shelving system disposed in the retail store, the retail store having the back room, the shelving system including a top shelf and customer shelves, wherein the top shelf is positioned generally above the customer shelves, wherein the top shelf and the back room are not accessible to public, and wherein the customer shelves are accessible to the public;
   sensors disposed at the retail store configured to obtain first scans of the top shelf and configured to obtain second scans of the customer shelves;
   a database, the database disposed at the retail store and configured to store a back room inventory value for a selected product, the back room inventory value being an amount of the selected product present in the back room;
   a transceiver circuit disposed at the retail store and coupled to the database, and the sensors;
   a network that is coupled to the transceiver circuit;
   a control circuit that is coupled to the network and is disposed at a central processing location, the control circuit configured to:
      receive the first scans and the second scans from the sensors, and the back room inventory value from the database;

determine when there is available space and a location of the available space for the selected product on the top shelf based upon a first analysis of the first scans;

based upon a second analysis of the second scans, determine a product location of the selected product on the customer shelves and whether the product location is within a predetermined distance of the available space on the top shelf; and determine when there is inventory of the selected product in the back room based at least in part upon the back room inventory value;

wherein when there is available space on the top shelf, when the location of the available space is within the predetermined distance of the product location, and when there is inventory of the selected product in the back room, at least some of the selected product is configured to be moved from the back room to the top shelf.

2. The system of claim 1, wherein one of the sensors is coupled to a ceiling of the store.

3. The system of claim 2, wherein the one of the sensors is a camera.

4. The system of claim 1, wherein one of the sensors is a scanner and another one of the sensors is a camera.

5. The system of claim 1, wherein the back room includes a plurality of bins.

6. The system of claim 1, wherein the selected product is configured to be placed in a position in the back room allowing retrieval of the selected product before other products.

7. The system of claim 1, wherein the retail store is a discount center, grocery store, department store, or hardware store.

8. The system of claim 1, wherein the sensors comprise a first sensor that obtains the first scans and a second sensor that obtains the second scans.

9. The system of claim 1, wherein the top shelf is coated by a coating that is configured to be detected by one of the sensors, detection of the coating being indicative of open space on the top shelf.

10. The system of claim 1, wherein an automated vehicle is configured to move the selected product.

11. A method for controlling the movement of products between a back room in a retail store and a top shelf of a shelving system in the retail store, the shelving system also including customer shelves, wherein the top shelf is positioned generally above the customer shelves, wherein the top shelf and the back room are not accessible to public, and wherein the customer shelves are accessible to the public, the method comprising:

obtaining first scans of the top shelf;

obtaining second scans of the customer shelves;

storing a back room inventory value for a selected product, the back room inventory value being an amount of the selected product present in the back room;

receiving the first scans and the second scans from sensors, and receiving the back room inventory value from a database;

determining when there is available space for a selected product on the top shelf based upon a first analysis of the first scans;

based upon a second analysis of the second scans, determining a location of the selected product on the customer shelves and whether the location is within a predetermined distance of the available space on the top shelf;

determining when there is inventory of the selected product in the back room based at least in part upon the back room inventory value;

when there is available space on the top shelf, when the available space is within the predetermined distance of the location, and when there is inventory of the selected product in the back room, moving at least some of the selected product from the back room to the top shelf.

12. The method of claim 11, wherein one of the sensors is coupled to a ceiling of the store.

13. The method of claim 12, wherein the one of the sensors is a camera.

14. The method of claim 11, wherein one of the sensors is a scanner and another one of the sensors is a camera.

15. The method of claim 11, wherein the back room includes a plurality of bins.

16. The method of claim 11, further comprising placing the selected product in a position in the back room allowing retrieval of the selected product before other products.

17. The method of claim 11, wherein the retail store is a discount center, grocery store, department store, or hardware store.

18. The method of claim 11, wherein the sensors comprise a first sensor that obtains the first scans and a second sensor that obtains the second scans.

19. The method of claim 11, wherein the top shelf is coated by a coating that is configured to be detected by one of the sensors, detection of the coating being indicative of open space on the top shelf.

20. The method of claim 11, wherein an automated vehicle moves the selected product.

* * * * *